US007907292B2

(12) United States Patent
Suzuki

(10) Patent No.: US 7,907,292 B2
(45) Date of Patent: Mar. 15, 2011

(54) TERMINAL DEVICE FOR PERFORMING PRINT PROCESSING, METHOD OF CONTROLLING THE SAME, AND COMPUTER PRODUCT

(75) Inventor: Katsunori Suzuki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 900 days.

(21) Appl. No.: 11/381,844

(22) Filed: May 5, 2006

(65) Prior Publication Data

US 2006/0256372 A1 Nov. 16, 2006

(30) Foreign Application Priority Data

May 13, 2005 (JP) ................................. 2005-141452

(51) Int. Cl.
*G06K 15/02* (2006.01)
*G06F 3/12* (2006.01)
(52) U.S. Cl. ..................... 358/1.13; 358/1.15; 358/1.16
(58) Field of Classification Search ................. 358/1.1, 358/1.9, 3.24, 1.13–1.16
See application file for complete search history.

(56) References Cited

U.S. PATENT DOCUMENTS

| 5,129,639 | A | | 7/1992 | DeHority |
| 5,960,168 | A | * | 9/1999 | Shaw et al. ................. 358/1.15 |
| 6,552,813 | B2 | * | 4/2003 | Yacoub ........................... 358/1.1 |
| 6,965,958 | B1 | * | 11/2005 | Sugiyama ..................... 710/104 |
| 7,777,904 | B2 | * | 8/2010 | Van Den Tillaart et al. . 358/1.15 |
| 2002/0181013 | A1 | | 12/2002 | Dunlap |
| 2006/0250638 | A1 | * | 11/2006 | Wang et al. .................. 358/1.15 |

FOREIGN PATENT DOCUMENTS

| EP | 1 471 418 A2 | 10/2004 |
| JP | 11-212742 | 8/1999 |
| JP | 2001-125761 | 5/2001 |
| JP | 2002-55914 | 2/2002 |
| JP | 2002-259097 | 9/2002 |
| JP | 2003-122529 | 4/2003 |
| JP | 2003-219097 | 7/2003 |
| JP | 2004-72247 | 3/2004 |
| JP | 2004-246620 | 9/2004 |
| JP | 3610140 | 10/2004 |
| JP | 2005-18503 | 1/2005 |

* cited by examiner

*Primary Examiner* — Scott A Rogers

(74) *Attorney, Agent, or Firm* — Oblon, Spivak, McClelland, Maier & Neustadt, L.L.P.

(57) ABSTRACT

During printing output of image data, the image data is temporarily stored in a temporary file. Printing data is obtained from the image data that is stored in the temporary file. The obtained printing data is compared with device data that is obtained from a destination printing device, and a result of the comparison is displayed to a user. Based on the result of the comparison, the user selects whether to execute a printing process.

13 Claims, 12 Drawing Sheets

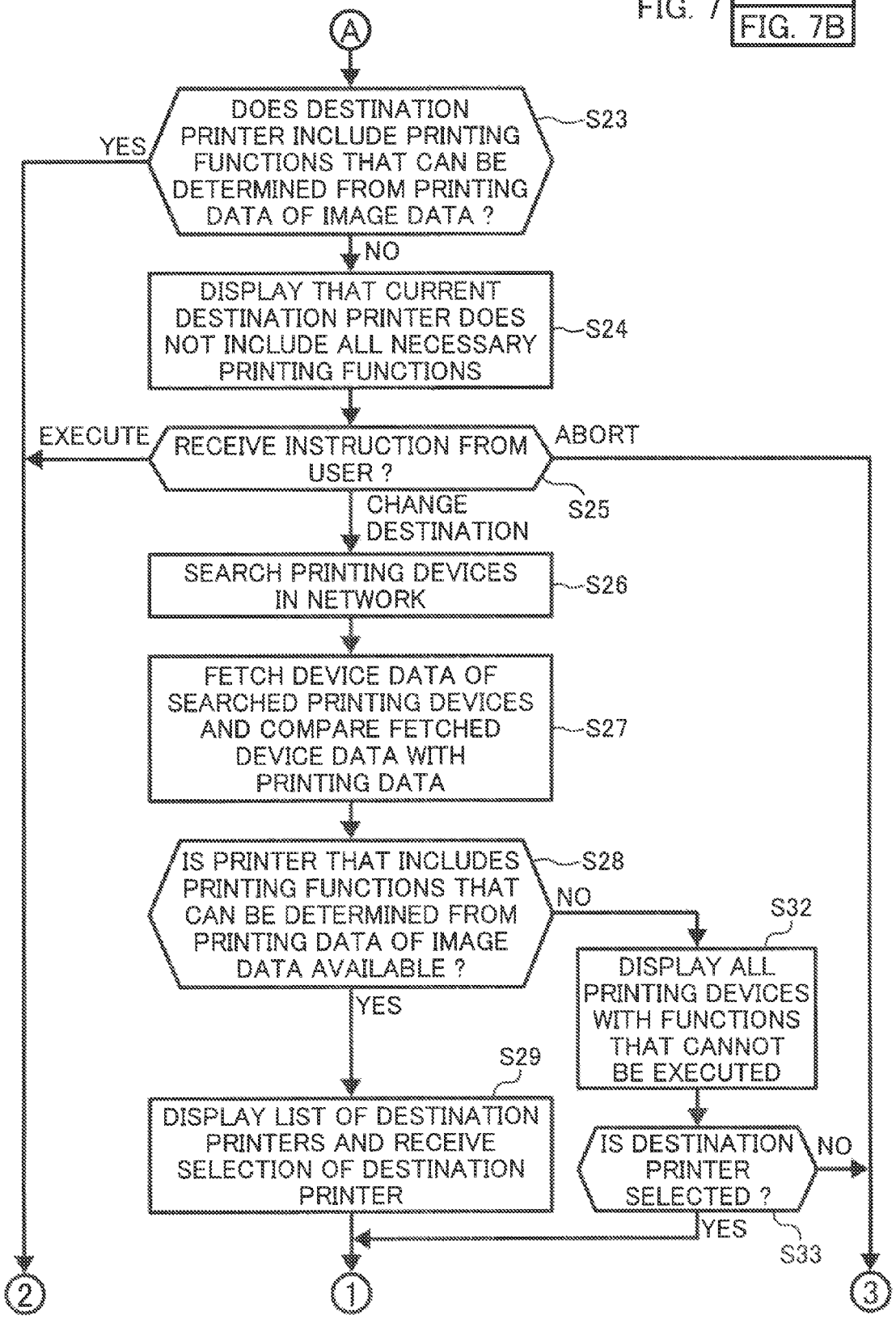

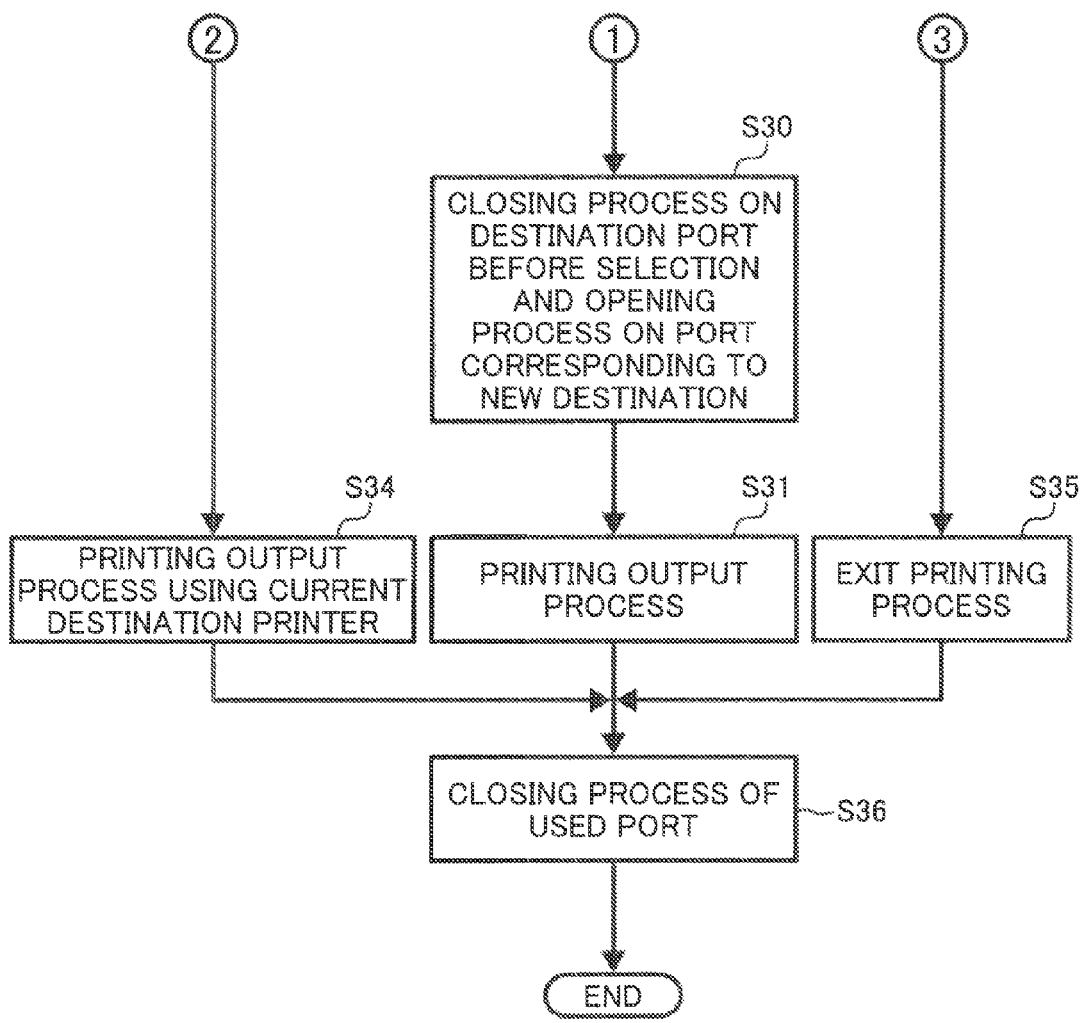

FIG. 9

SELECTION OF DESTINATION PRINTER

PRINTER SUITABLE FOR PRINTING JOB ARE FOUND. SELECT DESTINATION PRINTER AND PRESS OK TO CONTINUE. TO VIEW DESTINATION PRINTERS NOT DISPLAYED HERE, PRESS CANCEL.

| | PRINTER NAME | REMARKS | IP ADDRESS |
|---|---|---|---|
| ● | RICOH IPSiO Color 6000 | RECEPTION OF GENERAL AFFAIRS DIVISION | 192.168.0.100 |
| ○ | RICOH IPSiO Color 6000 | CORRIDOR OF GENERAL AFFAIRS DIVISION | 192.168.0.101 |
| ○ | RICOH IPSiO Color 7100 | DEVELOPMENT QUARTERS | 192.168.0.108 |
| ○ | RICOH IPSiO Color 6000 | DEVELOPMENT LABORATORY | 192.168.0.111 |

OK    CANCEL

FIG. 10

SELECTION OF DESTINATION PRINTER

FOLLOWING PRINTERS ARE FOUND BESIDE PRINTERS SATISFYING
ALL PRINTING CONDITIONS.
PRINTING MAY NOT BE PERFORMED AS INSTRUCTED.
DO YOU WANT TO CONTINUE?
SELECT DESTINATION PRINTER AND PRESS "YES" TO CONTINUE

| | PRINTER NAME | REMARKS | ID ADDRESS | INCOMPATIBILITY |
|---|---|---|---|---|
| ● | RICOH IPSiO Color 6000 | RECEPTION OF GENERAL AFFAIRS DIVISION | 192.168.0.100 | PRINTER LANGUAGE ABSENT |
| ○ | RICOH IPSiO Color 6000 | CORRIDOR OF GENERAL AFFAIRS DIVISION | 192.168.0.101 | COLOR PRINTING UNAVAILABLE |
| ○ | RICOH IPSiO Color 7100 | DEVELOPMENT QUARTERS | 192.168.0.108 | STAPLING NOT UNAVAILABLE |
| ○ | RICOH IPSiO Color 6000 | DEVELOPMENT LABORATORY | 192.168.0.111 | PRINTER LANGUAGE ABSENT |

YES   NO

TERMINAL DEVICE FOR PERFORMING PRINT PROCESSING, METHOD OF CONTROLLING THE SAME, AND COMPUTER PRODUCT

CROSS-REFERENCE TO RELATED APPLICATIONS

The present document incorporates by reference the entire contents of Japanese priority document, 2005-141452 filed in Japan on May 13, 2005.

BACKGROUND OF THE INVENTION

1. Field of the Invention

The present invention relates to a terminal device for performing a print processing, a method of controlling the terminal device, and a computer product.

2. Description of the Related Art

Recently, a printing process system is widely used in which a plurality of computer terminals are connected to a plurality of printing devices using a network such as a local area network (LAN). Thus, the printing devices are shared to be used among the computer terminals, and each computer terminal can select a printing device through the network.

In such printing process system, various types of printers are used. However, it is impossible to determine whether the printers can perform a desired printing process. For example, whether a destination printer is compatible with a printer driver installed in the computer terminal, or whether a printer is capable of color printing cannot be determined.

Due to this, printing process may be mistakenly carried out by using a printing device that is not compatible with the printing process, resulting in inconvenience to the user. For example, if the destination printer is not compatible with the printer driver installed in the computer terminal, the destination printer prints junk data, resulting in waste of paper and causing disadvantage to the user.

Printing process systems are provided that enable to overcome such inconvenience due to non-availability of destination printer data.

In a printing process system disclosed in Japanese Patent Laid-Open Publication No H11-212742, each version of a printer language processor of the printing device and the printer driver that is compatible with the printer language processor is confirmed, and based on a result of the confirmation, whether to execute the printing process is determined.

In a data processing method disclosed in Japanese Patent Laid-Open Publication No 2001-125761, it is possible to automatically set a destination printing device based on printing data, and to search the optimum printer during the series of operation from print command to printing execution, thereby enhancing work efficiency of the user.

In a printer searching system disclosed in Japanese Patent Laid-Open Publication No 2002-259097, it is possible to easily search a network printer that matches with the desired conditions.

However, the aforementioned inventions include the following drawbacks.

Although the printing system disclosed in Japanese Patent Laid-Open Publication No H11-212742 is possible to determine whether the printer driver installed in the computer terminal matches with the destination printer, the printing system is not able to get other type of printing data such as whether color printing is possible, or whether double-sided printing is possible. Thus, the printing system cannot obtain data pertaining to printing conditions that are desired by the user.

Moreover, although the printer searching system disclosed in Japanese Patent Laid-Open Publication No 2002-259097 is possible to search a printing device that satisfies the desired conditions, it is necessary to input each condition before each search and is time consuming.

In the data processing method disclosed in Japanese Patent Laid-Open Publication No 2001-125761, a list of destination printers is displayed at every printing process, which may cause confusion to some users.

In addition, sometimes users may execute the printing process while accepting to use a destination printer even if all desired printing functions are not realized in the destination printer. For example, if the user desires color printing but the destination printer is only capable of black and white printing, the user may choose to carry out the printing process using the destination printer if black and white printing is acceptable. Such a decision making depends on a type of the image data to be printed or a type of printing function that is not available. Therefore, making such decision is subtle and difficult, and is necessary to be left to judgment of the user.

SUMMARY OF THE INVENTION

It is an object of the present invention to at least partially solve the problems in the conventional technology.

A terminal device according to one aspect of the present invention is for performing a printing process. The terminal device includes a function of creating a temporary storage file and of temporarily storing the image data therein; a function of obtaining printing information on a printing function of the image data from stored image data; a function of obtaining device information on a printing function available in a printing device that is set as a printing destination; a function of comparing the printing information and the device information; and a function of determining whether to continue the printing process for the image data based on a result of comparison by the function of comparing. When the printing function in the device information includes all of the printing function in the printing information, the terminal device is configured to transmit the stored image data to the printing device set as the printing destination to perform a printing process for the image data, and when the printing function in the device information does not include all of the printing function in the printing data, the terminal device is configured to display that a printing function in the printing data is unavailable in the printing device set as the printing destination while listing unavailable functions, and to determine whether to continue the printing process of the image data based on an instruction to be externally input.

A method according to another aspect of the present invention is of controlling a terminal device for performing a print processing. The method includes creating a temporary storage file; storing the image data in the temporary storage file; obtaining printing information on a printing function of the image data from stored image data; obtaining device information on a printing function available in a printing device that is set as a printing destination; comparing the printing information and the device information; determining whether to continue the printing process for the image data based on a result of comparison at the comparing; transmitting the stored image data to the printing device set as the printing destination to perform the printing process for the image data, when the printing function in the device information includes all of the printing function in the printing information; and displaying that a printing function in the printing data is unavailable in the printing device set as the printing destination while listing unavailable functions when the printing function in the device information does not include all of the printing function in the printing data. The determining includes, when the display is displayed, determining whether to continue the printing process based on an instruction to be externally input.

A computer-readable recording medium according to still another aspect of the present invention stores a computer program for realizing a method of controlling the terminal device according to the above aspect.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a flowchart of the printing process in the printing process system;

FIG. 9 is a schematic of a dialogue that displays a list of optimum destination printers for a printing job;

FIG. 10 is a schematic of a dialogue that displays a list of all destination printers.

DETAILED DESCRIPTION OF THE PREFERRED EMBODIMENTS

Exemplary embodiments according to the present invention will be explained in detail with reference to the accompanying drawings.

Figure 1:
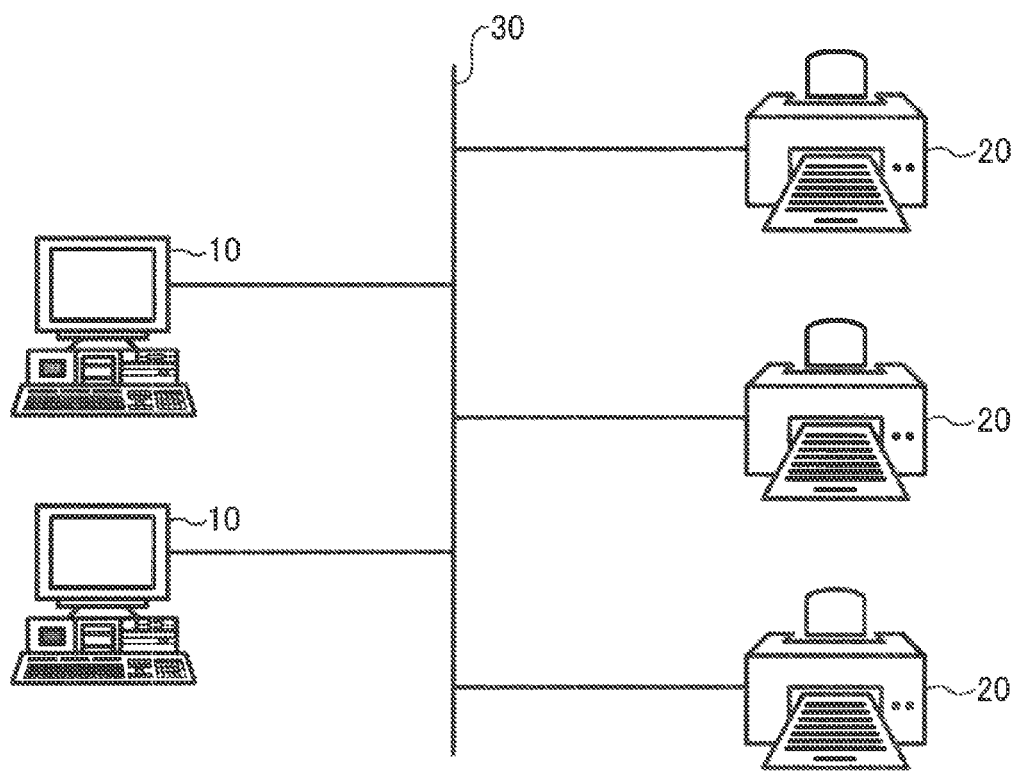
FIG. 1 is a schematic of a printing process system according to embodiments of the present invention.

FIG. 1 is a schematic of a printing process system according to the first embodiment. The printing process system includes a plurality of computer terminals 10 and a plurality of printing devices 20 that are connected via a network 30. The number of the computer terminals 10 and the printing devices 20 is not limited.

Figure 2:
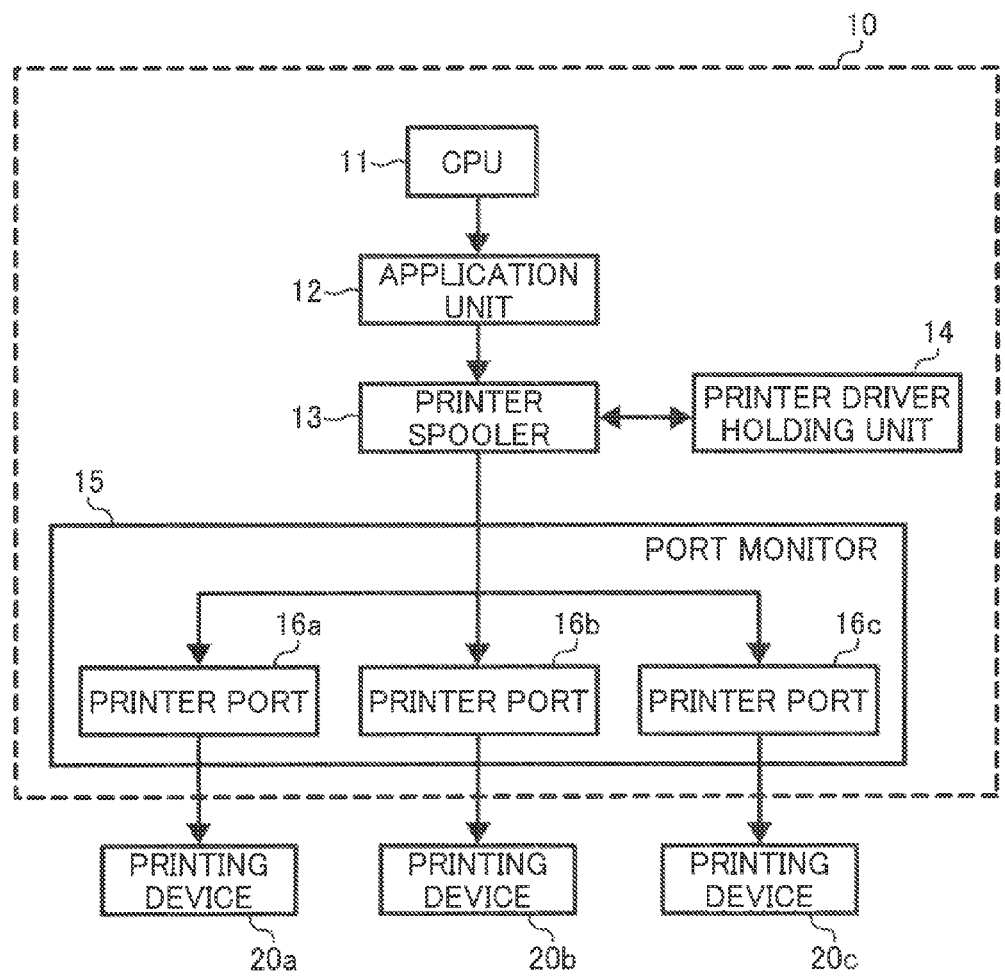
FIG. 2 is a block diagram of a computer terminal according to a first embodiment of the present invention.

FIG. 2 is a block diagram of the computer terminal 10. The computer terminal 10 includes a central processing unit (CPU) 11, an application unit 12, a printer spooler 13, a printer driver holding unit 14, and a port monitor 15.

The CPU 11 controls the computer terminal 10. The application unit 12 holds applications that are executable by the computer terminal 10. The application unit 12 holds at least a printer application. The printer application executes operations related to printing of image data.

Upon receiving a print request pertaining to image data from the application unit 12, the printer spooler 13 executes a spooling process. The spooling process includes a string of processes such as a saving process that temporarily saves the image data in an external storage device such as hard disk drive (HDD) etc., a conversion process that loads a printer driver from the printer driver holding unit 14 and converts the image data to the printer language of the printer driver, and a transmission process that sequentially transmits the image data to the printing device 20 via the port monitor 15 according to progress of the printing process in the printing device 20. When executing the printing process, the printer spooler 13 calls printing functions that are explained later and issues a command to the port monitor 15. The printer spooler 13 takes a backup of a printer port 16 (the printing device 20) that is used in the previous printing process, and unless the user sets a destination printer, the printer spooler 13 uses the backup printer port 16 as the destination printer to carry out the printing process. When the user is carrying out settings pertaining to printing destination, the printer spooler 13 calls "EnumPort" function that is explained later to display a port settings screen on the computer terminal 10 (see FIG. 5) and by carrying out selection settings pertaining to destination printer, switches the destination printer.

The printer driver holding unit 14 holds the printer driver. The printer driver is a driver (software) for using the printing device 20. The printer driver enables to convert the image data into the printer language that is compatible with the printing device 20 that is operated by the printer driver.

Based on a command by the printing function from the printer spooler 13, the port monitor 15 controls the printer port 16. The printer port 16 is a compatible port that is included for every printing device 20.

The printer spooler 13 calls the printing functions, thereby causing the port monitor 15 to carry out a predetermined process operation. The printing functions include "AddPort", "DeletePort", "EnumPort", "OpenPort", "ClosePort", "StartDocPort", "EndDocPort", "WritePort", and "ReadPort".

Figure 3:
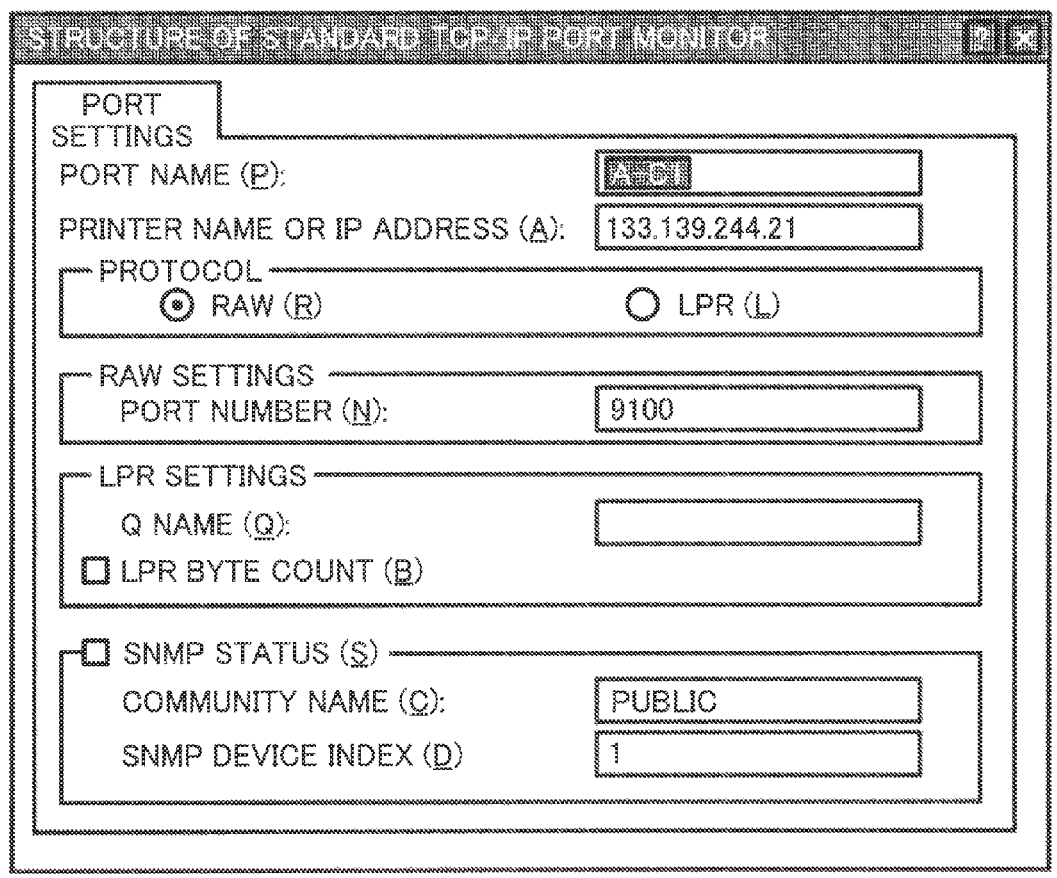
FIG. 3 is a schematic of a dialogue for new port addition.

"AddPort" is a function for adding a new port (printer port 16) and is used for recording the printing device 20 as a destination printer when the printing device 20 is connected to the network 30. The user inputs and sets a port name (printer port name) and a setting value of the port (for example, IP address etc.) by using a dialogue that is displayed on a display of the computer terminal 10. An example of a dialogue pertaining to new port addition is shown in FIG. 3.

Figure 4:
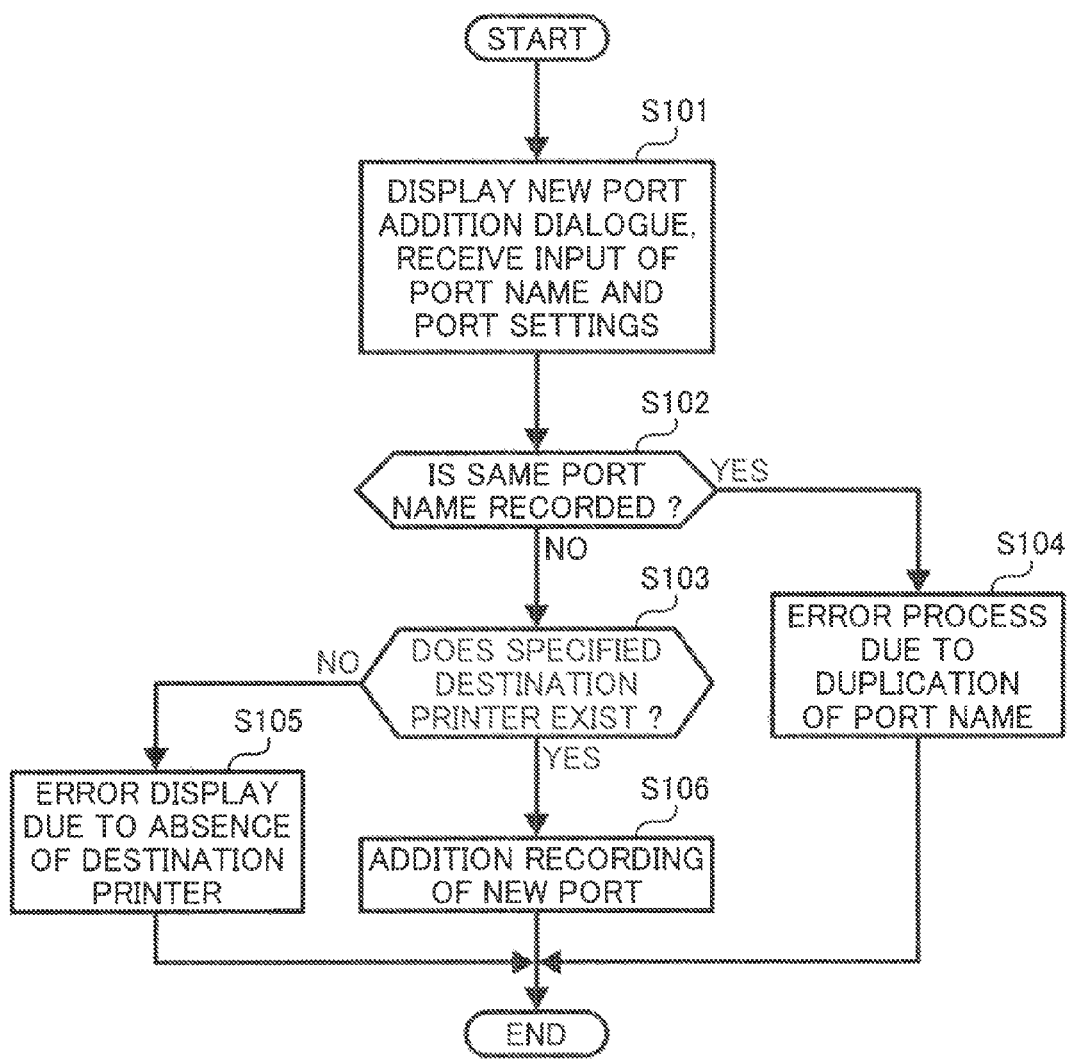
FIG. 4 is a flowchart of an AddPort process in the printing process system.

A flow of AddPort process is shown in FIG. 4. When executing AddPort, the dialogue pertaining to new port addition (see FIG. 3) is displayed on the display of the computer terminal 10 and the port monitor 15 receives an input pertaining to the port name of the new port and the setting value of the new port from the user (step S101). Next, the port monitor 15 determines whether the port name that is input is already recorded (step S102). If the port name is already recorded ("YES" at step S102), because the port name is repeated, the port monitor 15 displays a message "the port name is recorded" on the display of the computer terminal 10 and executes an error process to exit the AddPort process (step S104). The port monitor 15 refers to the setting value of the input port and determines whether the specified destination printer exists (step S103). If the specified destination printer does not exist ("NO" at step S103), the port monitor 15 displays a message "the specified destination printer does not exist" on the display of the computer terminal 10 and executes the error process to exit the AddPort process (step S105). If the input port name is not yet recorded ("NO" at step S102) and the input destination printer exists ("YES" at step S103), the port monitor 15 executes an addition recording process of the new port (step S106).

"DeletePort" is a function for deleting a recorded port (printer port 16). The user carries out a deletion process of the port by using a dialogue that is displayed on the display of the computer terminal 10.

Figure 5:
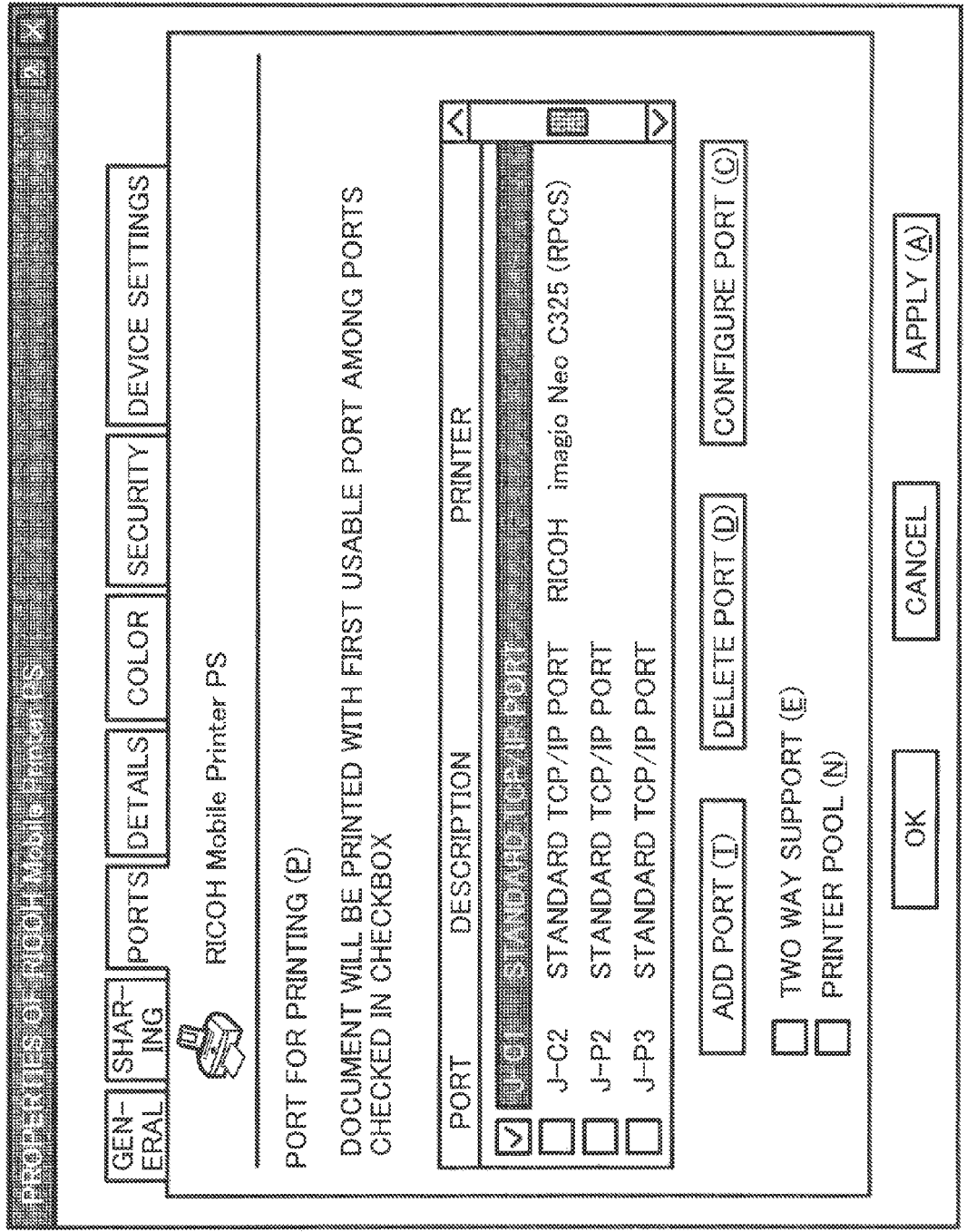
FIG. 5 is a schematic of a port settings screen.

"EnumPort" is a function for listing of ports (printer ports 16) that are handled by the port monitor 15. When carrying out a setting pertaining to a printing destination, the user calls the port settings screen that is shown in FIG. 5. The port settings screen enables the user to confirm a port that can be used by the computer terminal 10.

"OpenPort" is a function that is used to start using the port (printer port 16) that is specified by the user. Calling "OpenPort" function causes the port monitor 15 to carry out an opening process for the specified port. The opening process is an initialization process such as securing a work area, and a preparation process.

"ClosePort" is a function that is used to terminate using the port (printer port 16) that is used in "OpenPort". Calling the ClosePort function causes the port monitor 15 to carry out a closing process of the port. The closing process includes a releasing process of all the system resources that are allocated by the OpenPort function.

"StartDocPort" is a function that is used to execute the printing process of the image data. Calling the StartDocPort function causes the port monitor 15 to confirm a connection status with the destination printer and to confirm whether data can be transmitted. Further, the port monitor 15 executes a task to request start of a printing job on the specified port (printer port 16).

"EndDocPort" is a function that is used to terminate the printing process of the image data. Calling the EndDocPort function causes the port monitor 15 to execute an end task of the printing job on the specified port (printer port 16) and causes the printing device 20 to execute the printing process of the image data. In the present embodiment, the port monitor 15 executes an obtaining process of printing data pertaining to the image data, an obtaining process of device data pertaining to the printing device 20, and a comparing process of the printing data and the device data before causing the printing device 20 to execute the printing process. The aforementioned processes are explained in detail later.

"WritePort" is a function that is used to write the image data to the port (printer port 16). In the present embodiment, calling the WritePort function causes the port monitor 15 to create a temporary file that is a temporary saving file and to carry out a writing process of the image data to the created temporary file.

"ReadPort" is a function that is used to read data from the port (printer port 16).

In the printing process, the printing functions are executed in the sequence of "StartDocPort", "WriteDocPort", and "EndDocPort", and after "EndDocPort" function is called, a printing output process is carried out in the printing device 20. The aforementioned processes are carried out at the port that is subjected to the opening process by "OpenPort" function. After the printing process, "ClosePort" carries out the closing process.

Figure 6:
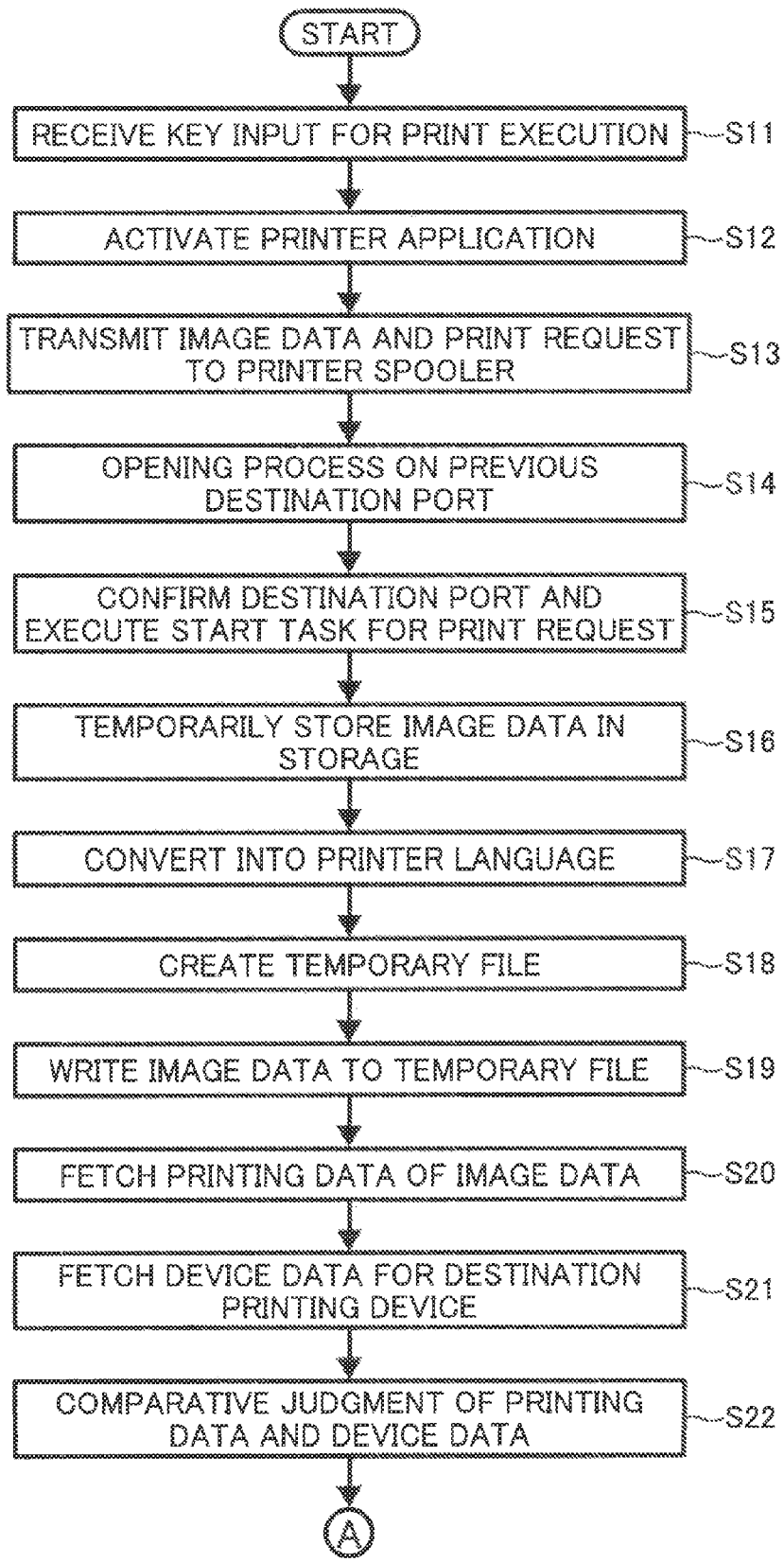
FIG. 6 is a flowchart of a printing process in the printing process system.

FIG. 6 and FIG. 7 are flowcharts of the printing process in the printing process system. Upon receiving a key input pertaining to print execution of the image data from the user (step S11), the CPU 11 of the computer terminal 10 activates the printer application of the application unit 12 (step S12). The printer application transmits the image data for printing and a print request pertaining to the image data to the printer spooler 13 (step S13).

Upon receiving the image data for printing and the print request pertaining to the image data from the printer application, the printer spooler 13 uses "OpenPort" function to carry out the opening process on the destination port (printer port 16) that is used in the previous printing process and stored as backup (step S14). If the user has input a setting pertaining to the destination port, the printer spooler 13 carries out the opening process on the printer port 16 that is input by the user. The printing process is executed by the printing device 20, which is connected to the printer port 16 that is subjected to the opening process.

Next, the printer spooler 13 uses "StartDocPort" function to confirm the connection status with the destination port and executes a start request task pertaining to the printing job (step S15). The printer spooler 13 carries out the spooling process on the image data for printing. In the spooling process, the printer spooler 13 temporarily stores the image data in the external storage device (step S16), loads the printer driver from the printer driver holding unit 14, and converts the image data into the printer language of the printer driver (step S17).

After converting the image data into the printer language that is compatible with the printing device 20, the printer spooler 13 calls "WritePort" function. Calling the WritePort function causes the port monitor 15 to create the temporary file that is a temporary saving file (step S18), and to write to the temporary file the image data that is converted into the printer language (step S19).

After completion of the writing process of the image data to the temporary file by the WritePort function, the printer spooler 13 calls "EndDocPort" function, thereby causing the port monitor 15 to execute an end task of the print job. In the present embodiment, the obtaining process of printing data of the image data in the temporary file (step S20), the obtaining process of the device data pertaining to the printing device 20 (step S21), and the comparing process of the printing data and the device data (step S22) are executed as the end task.

First, the obtaining process of the printing data is carried out on the image data that is written to the temporary file (step S20). The printing data is data pertaining to printing functions that are included in the image data and includes data such as printer language data, graphic data, hardware functions data etc. The graphic data includes data such as whether the image data is color image data, resolution of the image data etc. The hardware functions data includes data such as existence or absence of staples and punch holes, paper size, media type etc.

In the obtaining process of the printing data, attributes of the printer language are determined by searching whether a character string such as "@PJL ENTER LANGUAGE" which is a printer language switch command exists in the image data. The graphic data is determined by analyzing the printer language command, and a similar process also determines the hardware functions data.

Next, the port monitor 15 carries out the obtaining process of the device data pertaining to the printing device 20 that is set as the destination printer (step S21). In other words, the port monitor 15 obtains the device data of the printing device 20 that is connected to the printer port 16 that is subjected to the opening process at step S14. The port monitor 15 obtains the device data by using a simple network management protocol (SNMP). The device data includes data pertaining to the printing functions that can be executed by the printing device 20. To be more specific, the device data includes data pertaining to the printing functions that are compatible with the printing data of the image data.

Next, the port monitor 15 carries out the comparing process on the printing data of the image data obtained at step S20 and the device data of the printing device 20 obtained at step S21

(step S22). To be specific, the port monitor 15 carries out a comparative judgment pertaining to whether the printing functions (color printing etc.) that can be determined from the printing data of the image data can be realized by the destination printing device 20.

If the device data includes all the printing functions that can be determined from the printing data, in other words, if all the printing functions that can be determined from the printing data of the image data can be realized by the destination printing device 20 ("YES" at step S23), because the image data can be printed without any hindrance, the port monitor 15 causes the destination printing device 20 to execute a printing output process (step S34). In other words, the port monitor 15 transmits to the destination printing device 20 the image data that is written to the temporary file and executes the printing process. After the printing output process, the port monitor 15 carries out the closing process on the destination port that is used (step S36) and terminates the printing process.

If the device data does not include all the printing functions that can be determined from the printing data, in other words, if all the printing functions that can be determined from the printing data of the image data cannot be realized by the destination printing device 20 ("NO" at step S23), the port monitor 15 displays a dialogue to the effect on the display of the computer terminal 10 to get confirmation from the user and receiving instructions pertaining to the subsequent printing process (steps S23 and S24). An example of the aforementioned dialogue is shown in FIG. 8.

Figure 8:
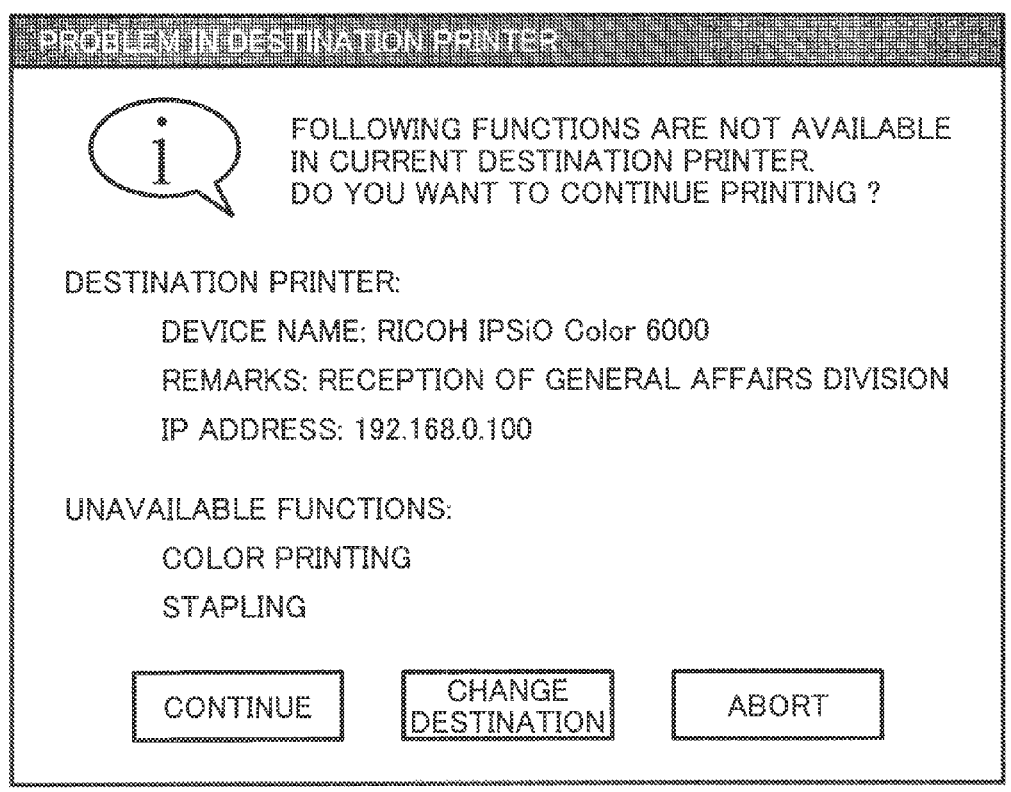
FIG. 8 is a schematic of a dialogue that displays that a current destination printer does not include all printing functions.

As shown in FIG. 8, the dialogue displays data pertaining to the destination printing device 20 (indicated by "destination") and functions that cannot be realized by the destination printing device 20 (indicated by "unusable functions"). Further, the dialogue displays three buttons (indicated by "Continue", "Modify destination", and "Abort") that receive instructions pertaining to the printing process from the user. "Unusable functions" are based on the result of the comparing process at step S22.

"Continue" is an input button for carrying out the printing process by using the destination printing device 20 even if some printing functions cannot be realized by the destination printing device 20. Upon pressing "Continue" button ("Continue" at step S25), the port monitor 15 transmits the image data in the temporary file to the destination printer that is currently used without executing a destination modifying process and executes the printing output process (step S34). After the printing output process, the port monitor 15 carries out the closing process on the destination port that is used (step S36) and terminates the printing process.

"Abort" is a button for terminating the printing process of the image data. Upon pressing "Abort" button ("Abort" at step S25), the port monitor 15 cancels the printing job and exits the printing process (step S35). When exiting the printing process, the port monitor 15 carries out the closing process on the destination port (step S36).

"Modify destination" button is a button for searching the printing devices 20 in the network 30 and carrying out modification of the destination printer. Upon pressing "Modify destination" button ("Modify destination" at step S25), the port monitor 15 uses the SNMP to search the printing devices 20 in the network 30 (step S26), simultaneously obtains device data pertaining to the searched printing devices 20, and carries out the comparative judgment pertaining to the obtained device data and the printing data of the image data. To be specific, the port monitor 15 carries out the comparative judgment pertaining to whether the printing functions (color printing etc.) that can be determined from the printing data of the image data can be realized by the searched destination printing devices 20 (step S27).

Based on the result of the comparative judgment at step S27, if the network 30 includes the printing devices 20 which include all the printing functions that can be determined from the printing data, in other words, if all the printing functions that can be determined from the printing data of the image data can be realized by the printing devices 20 that exist in the network 30 ("YES" at step S28), the port monitor 15 displays a list of such printing devices 20 and displays in the display of the computer terminal 10 a dialogue for selecting one of the printing device 20 to execute printing output (step S29). An example of the aforementioned dialogue is shown in FIG. 9.

As shown in FIG. 9, the dialogue displays a list of the destination printers together with the location of the destination printing devices 20, and includes a radio button for selection. In the dialogue, the user randomly chooses the destination printer by pressing the radio button and presses "OK" button to select the chosen destination printing device 20.

Upon selecting the new destination printer, the port monitor 15 carries out the closing process on the port (printer port 16) that corresponds to the previous destination printer and carries out the opening process on the port that corresponds to the new destination printer (step S30). Next the port monitor 15 transmits the image data in the temporary file to the printing device 20 that corresponds to the new destination port and carries out the printing output process (step S31). After the printing output process, the port monitor 15 carries out the closing process on the destination port that is used (step S36) and terminates the printing process.

Based on the result of the comparative judgment at step S27, if the network 30 does not include the printing devices 20 which include all the printing functions that can be determined from the printing data, in other words, if all the printing functions that can be determined from the printing data of the image data cannot be realized by the printing devices 20 that exist in the network 30 ("NO" at step S28), the port monitor 15 displays in the display of the computer terminal 10 a list of all the printing devices 20 that are connected to the network 30 and the printing functions that are not included in the printing devices 20 along with a dialogue for selecting the printing device 20 to execute printing output (step S32). An example of the aforementioned dialogue is shown in FIG. 10.

As shown in FIG. 10, in the dialogue, the port monitor 15 displays a list of the destination printers together with data pertaining to the location of the destination printers and data related to the printing functions included in the printing data of the image data that are not included in the printing devices 20. The dialogue includes a radio button as a means of selection. "Not included printing functions" are based on the result of the comparative judgment at step S27. In the dialogue, the user randomly chooses the destination printer by pressing the radio button and presses "YES" button to select the destination printing device 20. The user may press "NO" button to cancel the printing job and exit the printing process.

Upon selecting the destination printer in the dialogue shown in FIG. 10 ("YES" at step S33), the port monitor 15 carries out the closing process on the port (printer port 16) that corresponds to the previous destination printer and carries out the opening process on the port that corresponds to the new destination printer (step S30). Next the port monitor 15 transmits the image data in the temporary file to the printing device 20 that corresponds to the new destination printer and carries out the printing output process (step S31). After the printing output process, the port monitor 15 carries out the closing process on the destination port that is used (step S36) and terminates the printing process.

In the dialogue shown in FIG. 10, if the user presses "NO" button, in other words, if the user does not select the destination printer and does not execute the printing process ("NO" at step S33), the port monitor 15 exits the printing process (step S35). When exiting the printing process, the port monitor 15 carries out the closing process on the destination port (step S36).

In the aforementioned printing process, whether the destination printer includes the printing functions that are necessary for the printing process is automatically determined when carrying out the printing process. The printing process is executed if the destination printer includes all the necessary printing functions. If the destination printer does not include the necessary printing functions, a notification to the effect is displayed to the user (instructor of the printing process), and an input pertaining to whether to continue the printing process using the current destination printer or whether to search for another destination printer is received, thereby enabling to prevent execution of unnecessary printing process. Moreover, if the user accepts to use the destination printer even if all the printing functions are not included (for example, when the user desires color printing but black and white printing can also be allowed, or when the user desires a stapling process but not executing the stapling process can also be allowed), because the not included printing functions are notified, a decision pertaining to whether to execute the printing process is sought from the user, thereby enabling to contribute to the user's decision. Further, when searching the other destination printers, data pertaining to the printing functions that are included in the respective printing devices connected to the network is searched simultaneously for all the printing devices, the printing functions necessary for the printing process are compared with the printing functions that are included in the printing devices, and search results are displayed, thereby enabling the user to easily find the printing device that can execute the printing process.

Figure 11:
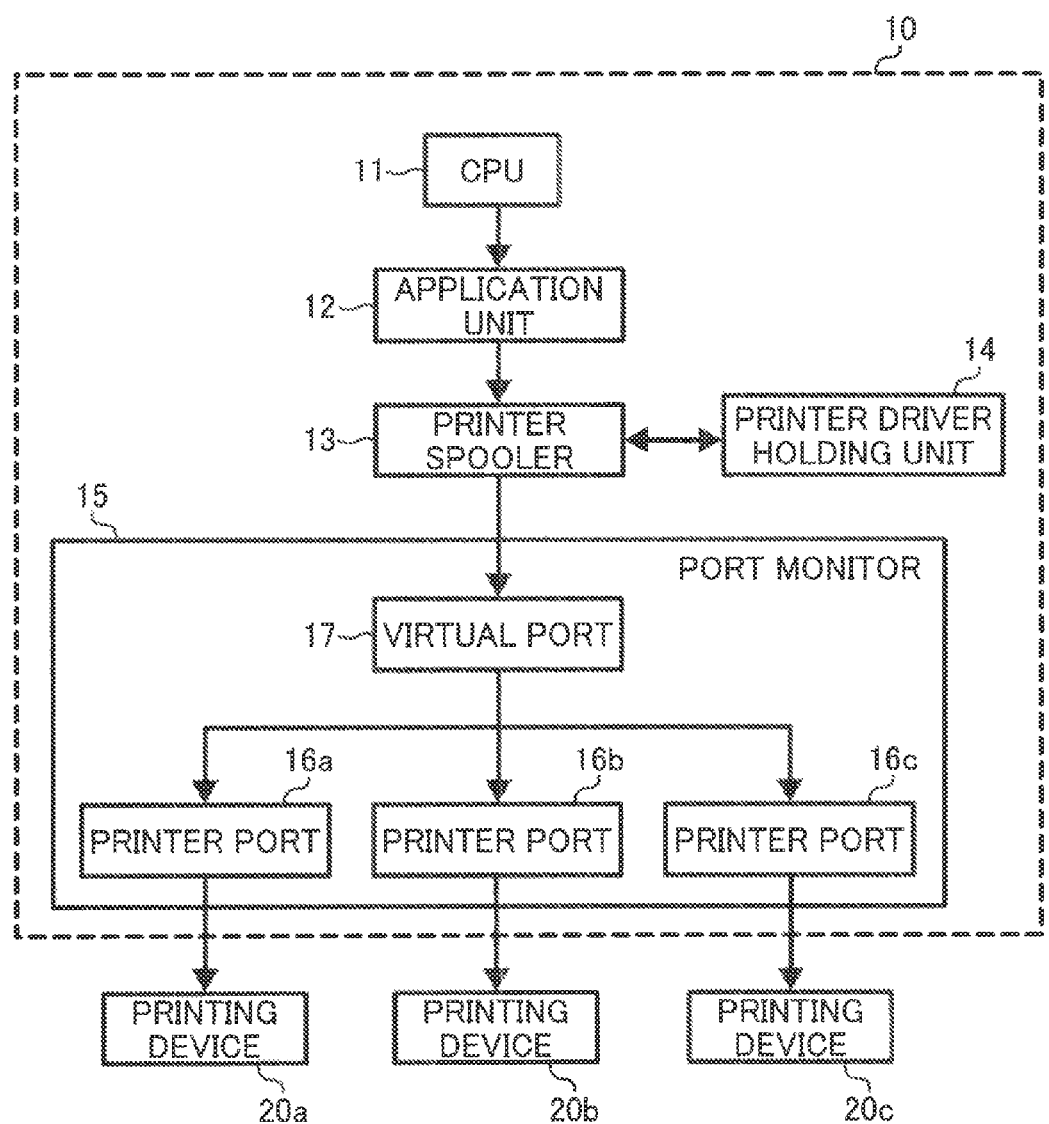
FIG. 11 is a block diagram of a computer terminal according to a second embodiment of the present invention.

A structure of the printing process system and a flow of the printing process according to a second embodiment of the present invention is the same as the structure of the printing process system and the flow of the printing process, respectively, according to the first embodiment. However, the port monitor 15 according to the second embodiment includes a virtual port 17. FIG. 11 is a block diagram of the computer terminal 10. Comparing the internal structure of the computer terminal 10 shown in FIG. 11 with the internal structure of the computer terminal 10 according to the first embodiment shown in FIG. 2, the port monitor 15 according to the present embodiment includes the virtual port 17.

In the present embodiment, the printing process is carried out by dynamically allocating the virtual port 17 during printing, thereby resulting in the following effects.

In the second embodiment, "AddPort" function does not execute a port addition process even after receiving a request to add a port (printer port 16). In other words, "AddPort" function does not respond to the port addition process. A new port is automatically recorded in the virtual port 17, thereby enabling to execute the printing process without carrying out the process flow shown in FIG. 4, in other words, without the need to carry out recording operations such as recording of port name etc. by the user, thus enabling to omit the unnecessary recording operations.

In the present embodiment, calling "EnumPort" function returns a virtual port name. The virtual port 17 is also subjected to "OpenPort" and "ClosePort".

A port monitor module according to the aforementioned embodiments (the first and the second embodiments) is included in the computer terminal 10 via an optical recording medium, a magnetic recording medium, a magneto optical recording medium, or a semiconductor recording medium etc. The port monitor module can also be included in the computer terminal 10 by using a file transfer protocol (FTP) to download the port monitor module via a network such as the Internet, a local area network (LAN) etc.

The aforementioned embodiments represent an example of the exemplary embodiments of the present invention, and do not limit the scope of the embodiments of the present invention. Therefore, the invention in its broader aspects is not limited to the specific details and representative embodiments shown and described herein. Accordingly, various modifications may be made without departing from the spirit or scope of the general inventive concept as defined by the appended claims and their equivalents. For example, in the first and the second embodiments, the SNMP is used to obtain the device data. However, other means to obtain the device data can also be used. The present invention is not limited to the above embodiments, and may be applied to a server device such as a printer server.

According to the present invention, it is possible to avoid wasteful execution of a printing process, and to reflect decision of a user in the printing process.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer terminal device that connects with a plurality of printing devices via a network, the computer terminal device comprising:
    a printer spooler that stores image data to be printed, generated by an application in a storage device; and
    a port monitor that transmits the image data to a printing device, wherein the port monitor generates a temporary file, stores the image data in the temporary file, retrieves printing information for the image data stored in the temporary file, retrieves device information from the printing device as a destination of a printing request via a port, compares the printing information with the device information, transmits the printing request to the printing device as a source of the printing information when the device information complies with the printing information, and allows a selection of a transmitting of the printing request to the printing device as the source of the printing information without changing the printing information, and a selection of a retrieving of an other printing device having device information that complies with the printing information from the plurality of printing devices, when the device information from the printing device does not comply with the printing information.

2. The computer terminal device according to claim 1, further comprising:
    a listing unit that lists retrieving results based on comparison results by the port monitor, wherein, when the retrieving is selected, the port monitor retrieves device information from all of the plurality of printing devices, the port monitor compares the printing information with the device information from all of the plurality of printing devices, and the listing unit lists the retrieving results.

3. The computer terminal device according to claim 2, wherein the retrieving results indicate one of the plurality of printing devices having device information that complies with the printing information.

4. The computer terminal device according to claim 3, wherein, when the device information from all of the plurality of printing devices does not comply with the printing information, the listing unit lists all of the plurality of printing devices and the printing information as the retrieving results.

5. The computer terminal device according to claim 1, wherein the device information from the other printing device is obtained by using a simple network management protocol.

6. The computer terminal device according to claim 1, further comprising:
a virtual port.

7. A method implemented by a computer terminal device, the method comprising:
storing image data in a temporary file;
retrieving printing information for the image data stored in the temporary file;
retrieving device information from a printing device as a destination of a printing request via a port;
comparing the printing information with the device information;
transmitting the printing request to the printing device as a source of the printing information, when the device information complies with the printing information;
allowing, with the computer terminal device, a selection of a transmission of the printing request to the printing device as the source of the printing information without changing the printing information, and a selection of a retrieval of an other printing device having device information that complies with the printing information from a plurality of printing devices, when the device information from the printing device does not comply with the printing information; and
transmitting the image data to the printing device.

8. The method according to claim 7, further comprising:
retrieving device information from all of the plurality of printing devices, and listing retrieving results based on comparisons of the printing information with the device information from all of the plurality of printing devices, when the retrieval is selected, when the device information from the printing device does not comply with the printing information.

9. The method according to claim 8, wherein the retrieving results indicate one of the plurality of printing devices that has device information that complies with the printing information.

10. The method according to claim 9, further comprising:
listing all of the plurality of printing devices and the printing information as the retrieving results, when the device information from all of the plurality of printing devices does not comply with the printing information.

11. The method according to claim 7, further comprising:
obtaining the device information of the other printing device by using a simple network management protocol.

12. The method according to claim 7, further comprising:
dynamically allocating a virtual port during a printing.

13. A computer-readable storage medium encoded with computer executable instructions, wherein the instructions, when executed by a processing unit, cause the processing unit to:
store image data in a temporary file;
retrieve printing information for the image data stored in the temporary file;
retrieve device information from a printing device as a destination of a printing request via a port;
compare the printing information with the device information;
transmit the printing request to the printing device as a source of the printing information, when the device information complies with the printing information;
allow a selection of a transmission of the printing request to the printing device as the source of the printing information without changing the printing information, and a selection of a retrieval of an other printing device having device information that complies with the printing information from a plurality of printing devices, when the device information from the printing device does not comply with the printing information; and
transmit the image data to the printing device.

* * * * *